United States Patent [19]

Kline

[11] 4,352,124
[45] Sep. 28, 1982

[54] AIRCRAFT PASSENGER ENTERTAINMENT SYSTEM

[75] Inventor: Donald D. Kline, Newport Beach, Calif.

[73] Assignee: Bell & Howell Company, Chicago, Ill.

[21] Appl. No.: 955,721

[22] Filed: Oct. 27, 1978

[51] Int. Cl.³ .................................... H04N 9/31
[52] U.S. Cl. ............................................ 358/60
[58] Field of Search ............. 358/60, 64, 51, 83, 358/237–239, 86, 108, 109; 315/370, 371, 386, 394–397; 313/2; 350/448, 314, 436; 352/66, 67, 42, 41; 353/69, 70, 31, 97

[56] References Cited

U.S. PATENT DOCUMENTS

| | | | |
|---|---|---|---|
| 2,654,854 | 10/1953 | Seright | 358/60 |
| 4,087,835 | 5/1978 | Nishimura et al. | 358/60 |
| 4,210,928 | 7/1980 | Ohmori et al. | 358/60 |
| 4,219,843 | 8/1980 | Takahashi | 358/60 |

OTHER PUBLICATIONS

*The Focal Encyclopedia of Film and Television Techniques,* Hastings House, New York, ©1969, pp. 380, 381.
Robertson, "Projection Television", *Wireless World,* vol. 82, No. 1489, pp. 47–52, Sep. 1976.

*Primary Examiner*—John C. Martin
*Attorney, Agent, or Firm*—Benoit Law Corporation

[57] ABSTRACT

An aircraft passenger entertainment system projects three complementary color component images, preferably from a passenger cabin ceiling, onto a flat screen with the aid of three imaging devices, each of which presents a different color component image in an image display field, and three associated projecting devices including a lens for each imaging device. Each image display field is disposed in a plane which is either parallel to the plane of a flat display screen or which intersects the plane of the display screen along a line extending parallel to the cabin floor of the aircraft. Each of the mentioned projecting lenses has an axis which is either perpendicular to the plane of the display screen or which is disposed in one of three parallel planes extending between the cabin ceiling and floor at right angles to the display screen.

34 Claims, 8 Drawing Figures

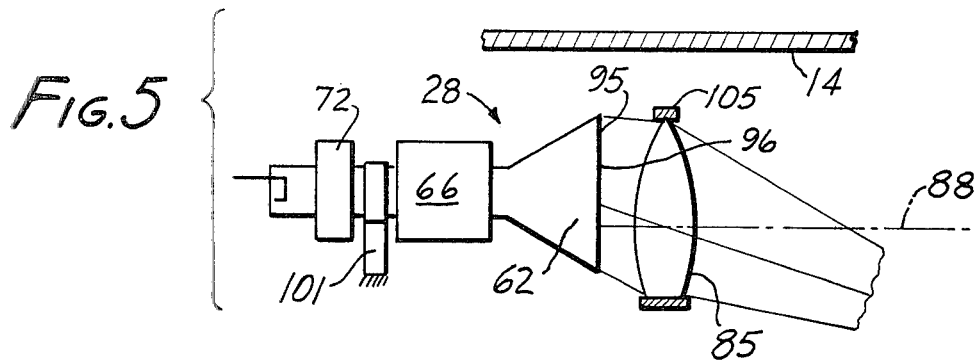
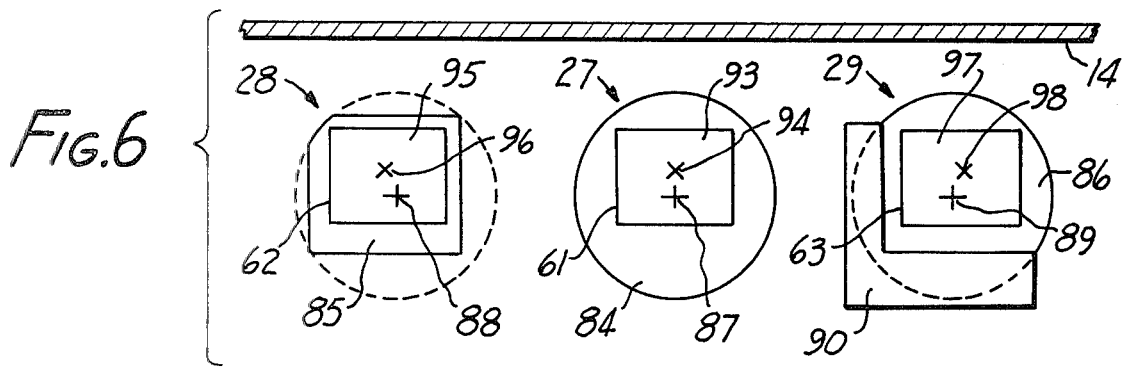
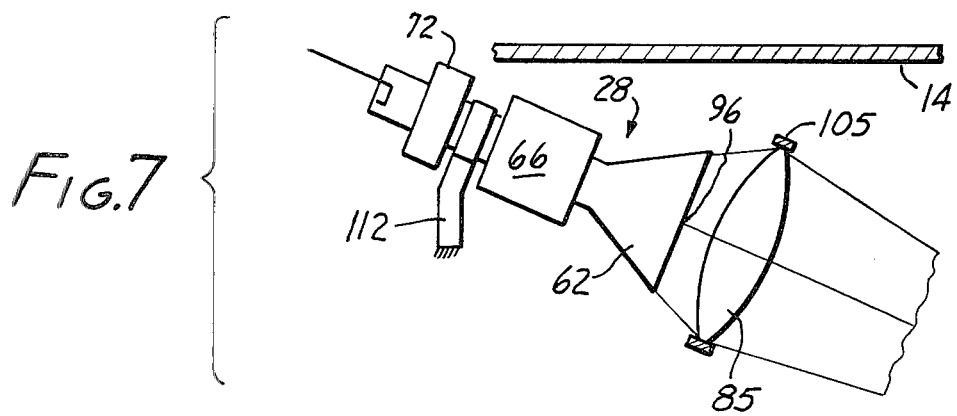

AIRCRAFT PASSENGER ENTERTAINMENT SYSTEM

FIELD OF THE INVENTION

The subject invention relates to aircraft and to methods and apparatus for entertaining passengers aboard aircraft and, more specifically, to color video entertainment systems for aircraft.

PRIOR-ART STATEMENT

In-flight motion picture entertainment has become a regular feature aboard many airlines. Electronic video display systems have joined this endeavor and it even has become possible to display off-the-air television programs to airline passengers, as may be seen from U.S. Pat. No. 3,972,045, assigned to the subject assignee. Recently, there has been an increasing desire by airline passengers to see color video presentations in essentially the same manner as motion picture displays, and a correspondingly increasing endeavor by airlines to provide their passengers with such enhanced entertainment. Also from a practical point of view, a reliable and effective color video projection system aboard aircraft would have significant advantages over its motion picture counterpart. For instance, video programs to be displayed could be prerecorded on magnetic tape in a video cassette, which is smaller, lighter, more manageable and more durable than corresponding motion picture film, and which can be prescrambled to discourage theft of precorded programs from the airplane, thereby impeding copyright infringement and overcoming the reluctance of film and video tape distributors to release first-run features to the airline industry.

Naturally, designers and developers of color video projection entertainment systems for aircraft turned to existing color television projection equipment for ideas and guidance. In this respect, a general survey is contained in THE FOCAL ENCYCLOPEDIA OF FILM & TELEVISION TECHNIQUES (Hastings House/Focal Press 1969) pp. 377 to 382, under "Large Screen Television". That entry defines large screen television in terms of images bigger than those that can be formed on a directly viewed cathode ray tube, and identifies the cathode ray tube projector and the Eidophor as suitable for its implementation.

Development of cathode ray tube projectors began over forty years ago, to become subsequently superseded by the Eidophor. That, however, is a complex, delicate and heavy machine which could not be used aboard aircraft. In recent years, there has been a resurgence of television projection systems as may, for instance, be seen from "A Buyer's Guide to Big-Screen Television" in VIDEOGRAPHY, May 1978, pp. 23 to 28. Unfortunately, color video projection systems that may be suitable for theatre or home use are not suitable aboard aircraft, especially in view of given conditions in an aircraft passenger cabin, including scarce space, exposure to interference by moving passengers, presence of rows of relatively high-backed seats, interference by intruding daylight and existence of numerous regulatory, limited weight and size and similar conditions.

In an endeavor to provide the requisite brightness under the latter on-board conditions, prior-art projection systems have resorted to high-gain screens, providing on-axis gains of as high as 10 to 15. This, in turn, has led to uneven display conditions as seen from various passenger seats throughout the passenger cabin and across the width thereof. Such brightness variations have been frequently characterized graphically as "hot spots". In an effort to overcome these and similar limitations, the recent prior art has resorted to curved screens. The resulting screen structure has, however, been generally disfavored by airlines and their designers, primarily because of the considerable weight, bulk and depth of curved screen structures. Such structures also introduce a certain directionality, which tends to relegate the location of the projection equipment to a space about halfway between passenger cabin floor and ceiling, thereby creating interference with seating arrangements, crew and passenger mobility and viewing comfort.

A representative example of a color image projection system with curved high-gain screen structure is apparent from U.S. Pat. No. 4,051,513. Representative examples of image registration techniques in color television projection equipment are apparent from U.S. Pat. Nos. 2,654,854 and 2,989,584. Of course, these are just a few of the very many prior patents existing in the particular field of interest.

None of these prior proposals and no combination thereof is seen as presenting a solution to the subject problem.

For example, the many prior-art dichroic mirror system exemplified in U.S. Patent 2,855,457 have the disadvantage of being too bulky for aboard aircraft use and of utilizing available space poorly.

The type of digital convergence system of U.S. Pat. No. 3,943,279, on the other hand, requires digital computer equipment for its operation, which practically excludes such systems from use in airline passenger entertainment systems.

In a different vein, architectural cameras have been known for years which avoid keystoning of images on the photographic plate or film by moving the camera lens laterally in a plane parallel to the plate or film or which provide the camera lens or lens system with a similar mobility. This, of course, results in a photographed image essentially free from keystoning, but does not solve the problem of keystoning in multicolor video projection.

SUMMARY OF THE INVENTION

It is a broad object of the subject invention to overcome the above mentioned disadvantages and meet the above mentioned needs.

It is a germane object of this invention to provide improved methods and apparatus for entertaining passengers aboard aircraft.

It is a related object of this invention to provide improved airborne color video projection systems.

It is also an object to overcome keystoning problems in color video projection systems.

Other objects will become apparent in the further course of this disclosure.

The subject invention is concerned with methods for displaying color video pictures to passengers aboard an aircraft with the aid of a first imaging device for presenting a first one of three complementary color component images in a first image display field, the first image display field having a first center, a first projecting device including a first lens for projecting the first image from the first field onto a screen, the first lens having a first lens axis, a second imaging device for presenting a second one of the color component images in a second image display field, the second image display field having a second center, a second projecting device including a second lens for projecting the second image from the second field onto the screen, the second lens having a second lens axis, a third imaging device for presenting the third of the color component images in a third image display field, the third image display field having a third center, and a third projecting device including a third lens for projecting the third image from the third field onto the screen, the third lens having a third lens axis.

From one aspect thereof, the subject invention resides in an improvement of such a method, comprising, in combination, the steps of mounting the screen in a first plane, disposing the first image display field in a plane parallel to the first plane, disposing the second image display field in a plane parallel to the first plane, disposing the third image display field in a plane parallel to the first plane, disposing each of the first, second and third lens axes perpendicularly to the first plane, providing a closer spacing between the second and third axes of the second and third lenses than between the second and third centers of the second and third image display fields, providing three complementary color component image signals for composing via the first, second and third imaging and projecting devices a color video picture, applying the three complementary color component signals respectively to the first, second and third imaging devices for providing the first, second and third color component images respectively in the first, second and third image display fields, and projecting the provided first, second and third color component images respectively with the first, second and third projecting devices, including the first, second and third lenses, onto the screen for composite viewing of the color video picture by the passengers.

From another aspect thereof, the subject invention resides in a further improvement of such a method, comprising in combination the steps of mounting the screen between a ceiling and a floor in the aircraft, disposing the first image display field in a plane parallel to the first plane, disposing the second image display field in a plane parallel to the first plane, disposing the third image display field in a plane parallel to the first plane, disposing the first, second and third lens axes in three parallel planes extending between the ceiling and floor at right angles to the screen, providing a closer spacing between the second and third axes of the second and third lenses than between the second and third centers of the second and third image display fields, providing three complementary color component image signals for composing via the first, second and third imaging and projecting devices a color video picture, applying the three complementary color component signals respectively to the first, second and third imaging devices for providing the first, second and third color component images respectively in the first, second and third image display fields, and projecting the provided first, second and third color component images respectively with the first, second and third projecting devices, including the first, second and third lenses, onto the screen for composite viewing of the color video picture by the passengers.

From another aspect thereof, the subject invention resides in a further improvement of such a method, comprising in combination the steps of mounting the screen between a ceiling and a floor in the aircraft, disposing the first image display field in a plane intersecting the first plane along a line extending parallel to the floor, disposing the second image display field in a plane intersecting the first plane along a line extending parallel to the floor, disposing the third image display field in a plane intersecting the first plane along a line extending parallel to the floor, disposing the first, second and third lens axes in three parallel planes extending between the ceiling and floor at right angles to the screen, and providing a closer spacing between the second and third axes of the second and third lenses than between the second and third centers of the second and third image display fields, providing three complementary color component image signals for composing via the first, second and third imaging and projecting devices a color video picture, applying the three complementary color component signals respectively to the first, second and third imaging devices for providing the first, second and third color component images respectively in the first, second and third image display fields, and projecting the provided first, second and third color component images respectively with the first, second and third projecting devices, including the first, second and third lenses, onto the screen for composite viewing of the color video picture by the passengers.

In the aspects so far recited, and in accordance with the subject invention, marginal portions of at least some of the mentioned first, second and third lenses are omitted to precorrect spatial brightness variations in the color video picture. Also, in accordance with the subject invention, marginal portions of at least some of the first, second and third projecting devices may be selectively obscured to precorrect spatial brightness variations in the color video picture.

From another aspect thereof, the subject invention resides in apparatus for displaying color video pictures to passengers aboard an aircraft, comprising, in combination, means for providing three complementary color component image signals for composing a color video picture, a video image projection screen, means for mounting said screen in a first plane, and means connected to said providing means for projecting in response to said three color component image signals three complementary color component images onto said screen mounted in said first plane for composite viewing of said color video picture by said passengers, said projecting means including a first imaging device for presenting in response to a first one of said color component image signals a first one of said complementary color component images in a first image display field, said first image display field having a first center, means for mounting the first imaging device for disposition of said first image display field in a plane parallel to said first plane, a first projecting device including a first lens for projecting said first image from said first field onto said screen, said first lens having a first lens axis extending perpendicularly to said first plane, a second imaging device for presenting in response to a second one of said color component image signals a second one of said color component images in a second image display field, said second image display field having a second center, means for mounting said second imaging device for disposition of said second image display field in a plane parallel to said first plane, a second projecting device including a second lens for projecting said second image from said second field onto said screen, said second lens having a second lens axis extending perpendicularly to said first plane, a third imaging device for presenting in response to the third of said color component image signals the third or said color component images in a third image display field, said third image display field having a third center, means for mounting said third imaging device for disposition of said third image display field in a plane parallel to said first plane, a third projecting device including a third lens for projecting said third image from said third field onto said screen, said third lens having a third lens axis extending perpendicularly to said first plane, and means for mounting said lenses relative to said image display fields for a closer spacing between said second and third axes of said second and third lenses than between said second and third centers of said second and third image display fields, with said first, second and third lens axes remaining perpendicular to said first plane.

From another aspect thereof, the subject invention resides in apparatus for displaying color video pictures to passengers aboard an aircraft having a floor and a ceiling above said floor, comprising, in combination, means for providing three complementary color component image signals for composing a color video picture, a video image projection screen, means for mounting said screen between said ceiling and said floor in a first plane, and means connected to said providing means for projecting in response to said three color component image signals three complementary color component images onto said screen mounted in said first plane for composite viewing of said color video picture by said passengers, said projecting means including a first imaging device for presenting in response to a first one of said color component image signals a first one of said complementary color component images in a first image display field, said first image display field having a first center, means for mounting said first imaging device for disposition of said first image display field in a plane parallel to said first plane, a first projecting device including a first lens for projecting said first image from said first field onto said screen, said first lens having a first lens axis, a second imaging device for presenting in response to a second one of said color component image signals a second one of said color component images in a second image display field, said second image display field having a second center, means for mounting said second imaging device for disposition of said second image display field in a plane parallel to said first plane, a second projecting device including a second lens for projecting said second image from said second field onto said screen, said second lens having a second lens axis, a third imaging device for presenting in response to the third of said color component image signals the third of said color component images in a third image display field, said third image display field having a third center, means for mounting said third imaging device for disposition of said third image display field in a plane parallel to said first plane, a third projecting device including a third lens for projecting said third image from said third field onto said screen, said third lens having a third lens axis, and means for mounting said first, second and third projecting devices for disposition of said first, second and third lens axes in three parallel planes extending between said ceiling and floor at right angles to said screen, said projecting devices mounting means including means for mounting said lenses relative to said image display fields for a closer spacing between said second and third axes of said second and third lenses than between said second and third centers of said second and third image display fields, with said first, second and third lens axes remaining disposed in said three parallel planes.

From another aspect thereof, the subject invention resides in apparatus for displaying color video pictures to passengers aboard an aircraft having a floor and a ceiling above said floor, comprising, in combination, means for providing three complementary color component image signals for composing a color video picture, a video image projection screen, means for mounting said screen between said ceiling and said floor in a first plane, and means connected to said providing means for projecting in response to said three color component image signals three complementary color component images onto said screen mounted in said first plane for composite viewing of said color video picture by said passengers, said projecting means including a first imaging device for presenting in response to a first one of said color component image signals a first one of said complementary color component images in a first image display field, said first image display field having a first center, means for mounting said first imaging device for disposition of said first image display field in a plane intersecting said first plane along a line extending parallel to said floor, a first projecting device including a first lens for projecting said first image from said first field onto said screen, said first lens having a first lens axis, a second imaging device for presenting in response to a second one of said color component image signals a second one of said color component images in a second image display field, said second image display field having a second center, means for mounting said second imaging device for disposition of said second image display field in a plane intersecting said first plane along a line extending parallel to said floor, a second projecting device including a second lens for projecting said second image from said second field onto said screen, said second lens having a second lens axis, a third imaging device for presenting in response to the third of said color component image signals the third or said color component images in a third image display field, said third image display field having a third center, means for mounting said third imaging device for disposition of said third image display field in a plane intersecting said first plane along a line extending parallel to said floor, a third projecting device including a third lens for projecting said third image from said third field onto said screen, said third lens having a third lens axis, and means for mounting said first, second and third projecting devices for disposition of said first, second and third lens axes in three parallel planes extending between said ceiling and floor at right angles to said screen, said projecting devices mounting means including means for mounting said lenses relative to said image display fields for a closer spacing between said second and third axes of said second and third lenses than between said second and third centers of said second and third image display fields, with said first, second and third lens axes remaining disposed in said three parallel planes.

In the apparatus aspects so far recited, and in accordance with the subject invention, means are present in at least some of the mentioned first, second and third projecting devices for selectively obscuring marginal portions of at least some of the first, second and third projecting devices to precorrect spatial brightness variations in the color video picture. Also, in accordance with the subject invention, at least some of the first, second and third lenses have truncated margins for precorrecting spatial brightness variations in the color video picture.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 5 is a side view of the image display and projection assembly shown in FIG. 4b;

FIG. 6 is a frontal view of the assembly shown in FIGS. 4b and 5; and

FIG. 7 is a side view of an image display and projection assembly according to a further embodiment.

DESCRIPTION OF PREFERRED EMBODIMENTS

Figure 1:
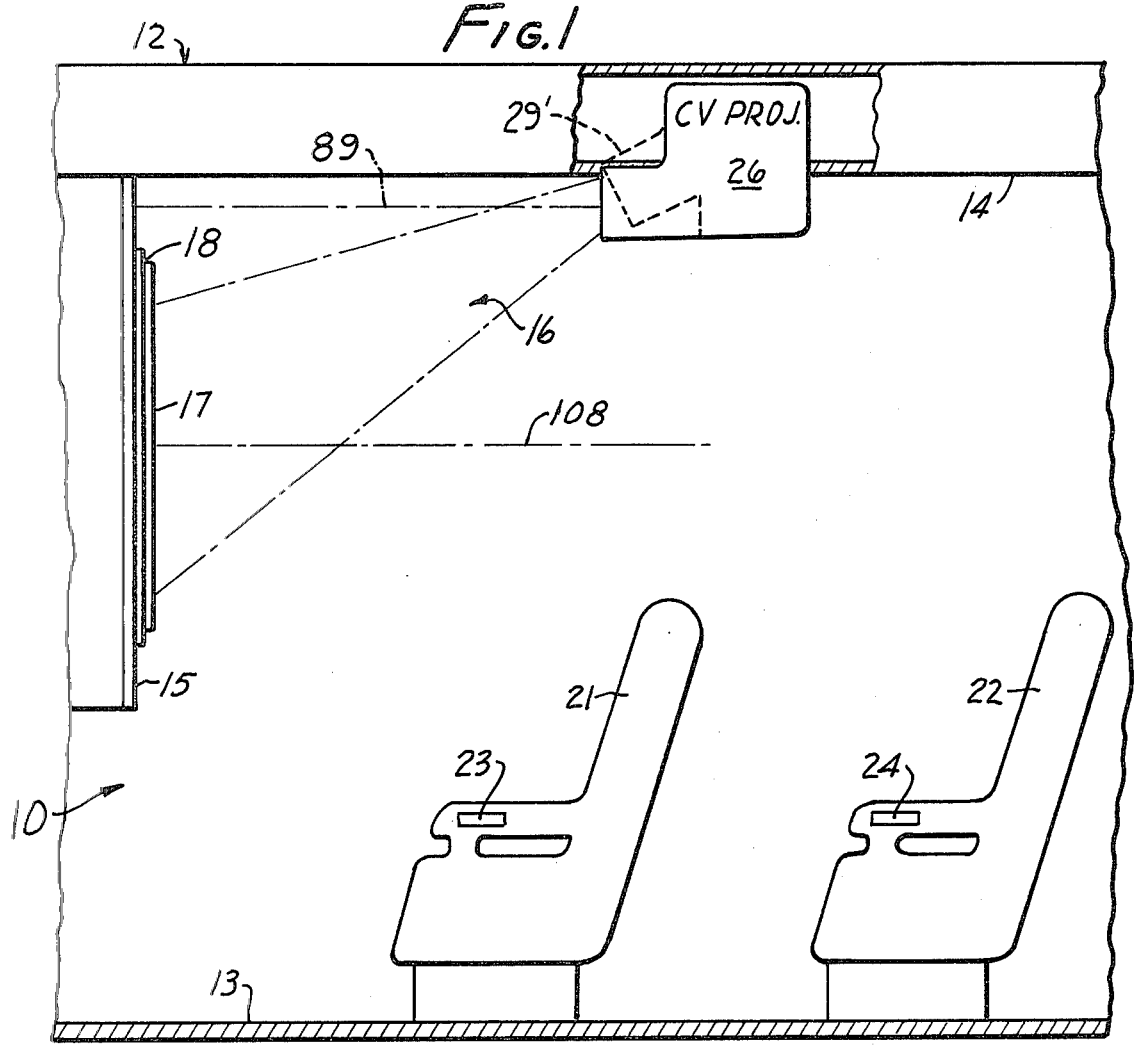
FIG. 1 is a fractional side view of a passenger cabin part of an aircraft including a passenger entertainment system in accordance with a preferred embodiment of the subject invention.

The passenger cabin 10 partially shown in FIG. 1 is part of an aircraft 12, having a floor 13 and a ceiling 14 above the floor. The cabin 10 has a bulkhead or class divider, part of which is shown at 15. The bulkhead extends preferably at right angles to the floor 13 or ceiling 14.

The illustrated passenger entertainment system 16 includes a video image projection screen 17 and means, such as a mounting frame 18, for mounting the projection screen 17 in a flat condition in the aircraft or cabin for viewing by passengers located in a number of seats, two of which are seen in FIG. 1 at 21 and 22. The passenger entertainment system 16 also has means for providing an audio accompaniment for displayed video pictures and for reproducing such audio accompaniment during the video picture display. Such audio equipment may be of a conventional type and is symbolically illustrated in FIG. 1 by blocks 23 and 24. As is well known, it is customary in aircraft to equip such an audio system with an audio channel selector and earphones or headsets (now shown) to enable passengers to listen to various musical and other presentations, and to sound accompaniments for motion picture films or video displays.

In the practice of the subject invention, three complementary color component images are projected onto the flat screen in response to three color component image signals for composite viewing of color video pictures by passengers.

In accordance with the illustrated preferred embodiment of the subject invention, the three complementary color component images are projected from the ceiling 14 to the flat screen 17 by a color video projector having three distinct electro-optical projecting devices 27, 28 and 29 for individually projecting the three color component images in mutual coincidence or registration onto the screen 17.

As shown in FIG. 1, the projector 26 is mounted at the ceiling 14. For instance, a projector 26 may at least partially be located in a hollow space above the cabin ceiling, or may be attached to such ceiling as is now customary with motion picture projectors provided for the entertainment of airline passengers.

As a special feature of the illustrated system, projection screen 17 not only is mounted in a flat condition, but also has an on-axis gain of more than one and less than four. In this manner, the above mentioned hot spots encountered with high-gain screens are avoided. Also, avoidance of the now customary curved prior-art display screen structure not only avoids the weight and bulk of such a structure, but also permits images to be projected as shown in FIG. 1 in an off-axis mode, such as from the ceiling 14 onto a flat screen 17 extending in the space between floor and ceiling at right angles to the floor 13 or ceiling 14. In this manner, the color video projector 26 is located out of the way of passengers, cabin crew and cabin equipment, for an unobstructed viewing of the projected images from all passenger seat locations.

A first one of the three color component images, such as the green component image 31, is projected from the ceiling onto the mounted flat screen 17 in symmetry to, and from a first location intersected by, a plane 32 extending at right angles to the floor 13 and mounted flat screen 17. That first location, in the illustrated preferred embodiment, is the location of the first color component projecting device 27. A second one of the color component images, such as the red component image 33, is projected from the ceiling 14 onto the mounted flat screen 17 from a second location situated at one side of the plane of symmetry 32 and occupied by the second color component projecting device 28. The third one of the color component images, such as the blue component image 34, is projected from the ceiling 14 onto the mounted flat screen 17 from a third location situated at a side of the plane of symmetry 32 opposite the mentioned one side, and occupied by the third color component image projecting device 29.

The one color component image 31 is thus projected to subject that one image potentially to vertical keystoning on the mounted flat screen 17. The other two color component images 33 and 34, on the other hand, are projected to subject these other two images potentially to vertical and horizontal keystoning on the mounted flat screen 17.

Figure 3:
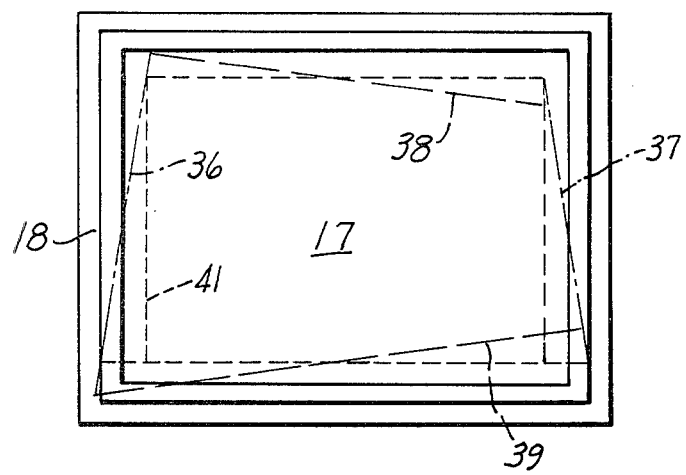
FIG. 3 is an elevation of a projection screen useful in the entertainment system according to the illustrated preferred embodiment, together with illustrations of projected images and their potential distortions.

In this respect, and in the context of the view of FIG. 3, lateral phantom lines 36 and 37 show effects of vertical keystoning in a displayed image, while lines 38 and 39 show effects of horizontal keystoning.

A rectangular dotted outline 41, on the other hand, shows the picture after it is actually displayed upon keystone precorrection in accordance with a preferred embodiment of the subject invention.

In particular, reference may be had at this juncture to the block diagram of FIG. 4 showing the electronic and electrooptical components of the illustrated passenger entertainment system in accordance with a preferred embodiment of the subject invention. According to FIG. 4, a video tape recorder, television receiver or other color video signal source 41 supplies a synchronized composite color video signal simultaneously to a video buffer 42, chroma processing unit 43 and sync detector 44. The video buffer 42 applies the luminance portion of the composite color video signal to a luminance processing unit 45 via a delay 46 which makes up for delays encountered in the chroma processing branch.

The chroma processing unit 43 applies the synchonized chroma portion of the signal to a chrominance decoder 47 and a burst detector 48. The detector 48, with the aid of a sync signal supplied by the detector 44, detects the burst or color synchronization information in the chroma signal portion and controls the chrominance decoder 47 to provide color difference signals (R−Y), (G−Y), and (B−Y). These color component signals are applied to three output amplifiers 51, 52 and 53 which also receive the luminance signal Y from the luminance processing unit 45, in order to provide in leads 54, 55 and 56 three complementary color component image signals for composing a color video picture through projection via the devices 27 to 29.

In particular, each of the color component image projection devices 27, 28 and 29 includes an individual cathode ray image projection tube 61, 62 or 63, as seen in FIG. 4.

For the sake of simplicity, FIG. 4 shows the projection tubes 61 to 63 without the aircraft cabin 10. It should, however, be understood that the first image projection tube 61 in the system shown in FIGS. 1 and 2 extends in the above mentioned plane of symmetry 32 which intersects the floor 13 and mounted flat screen 17 at right angles. The second image projection tube 62 is situated at one side of the plane of symmetry 32, as shown for the projection device 28 in FIG. 2. Conversely, the third image projection tube 63 is situated at a side of the plane of symmetry 32 opposite the latter one side, as shown for the projection device 29 in FIG. 2.

Each of the cathode ray rubes 27, 28 and 29 has its own main deflection yoke 65, 66 and 67, as well as an individual auxiliary deflection yoke 71, 72 and 73. The sync detector 44 drives a deflection generator 74 which supplies vertical deflection information to a vertical deflection unit 75 and horizontal deflection information to a horizontal deflection unit 76.

The vertical deflection signal supplied by the unit 75 is applied to the vertical sections of the principal yokes 65 to 67 for vertical scanning of the cathode ray in each of the projection tubes 61 to 63. The horizontal deflection signal provided by the unit 76 is supplied to the horizontal deflection sections of the principal deflection yokes 65 to 66, for the horizontal scan of the cathode rays in the projection tubes 61 to 63.

A registration generator 79 derives horizontal and vertical deflection information from the deflection generator 76 to provide for the customary centering and registration of the projected color component images in the illustrated tricolor projection system. In the illustrated preferred embodiment, the registration generator 79 drives the auxiliary yokes 71 to 73 which, in similarity to the principal yokes 65 to 67, also have vertical and horizontal deflection yoke sections.

In principle, color filters could be employed in conjunction with the cathode ray tubes 61 to 63. It is, however, preferred that different phosphors be employed at the faces of the cathode ray tube to provide the differently colored component images, such as the green component image at the face of the tube 61, the red component image at the face of the tube 62 and the blue component image at the face of the tube 63 upon energization of the cathodes of the tubes via leads 54 to 56 with the three complementary color component image signals.

Figure 4B:
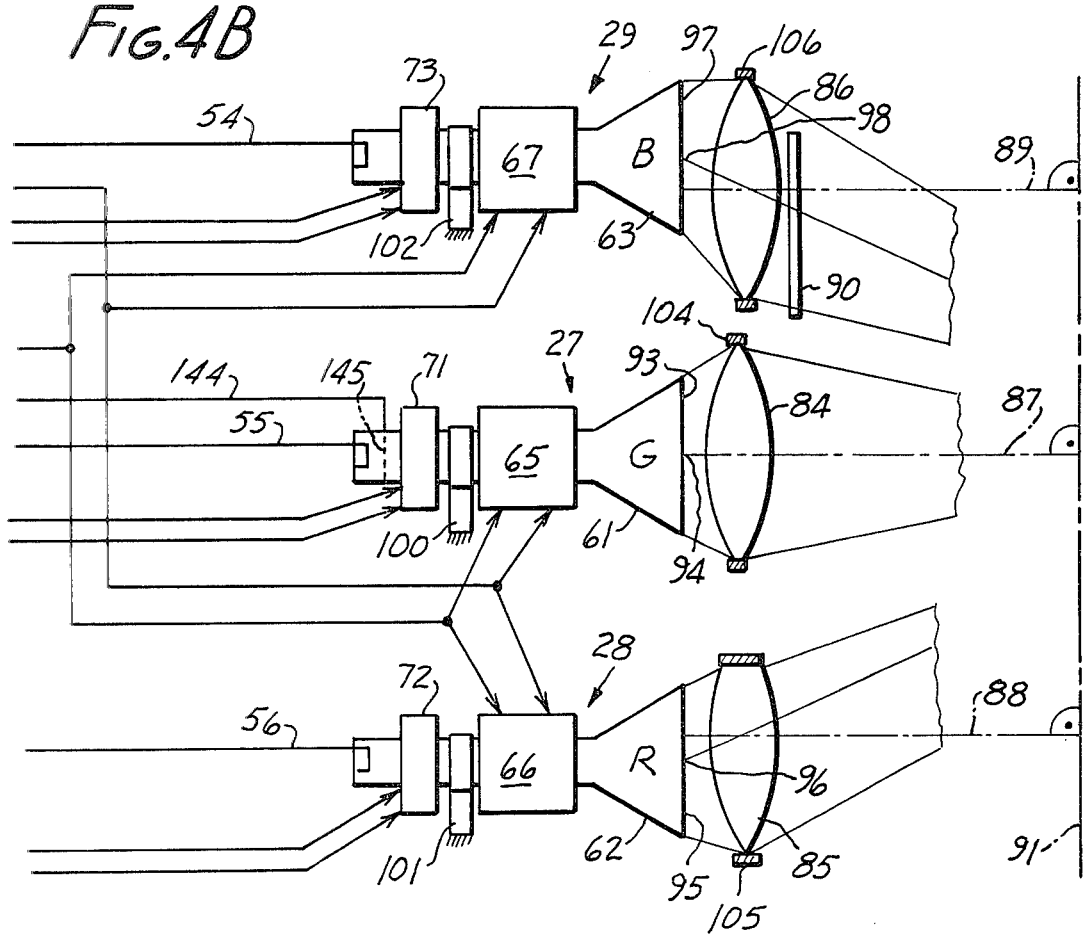
FIG. 4, having portions a and b to be juxtaposed side by side, is a block diagram primarily of the electronic portion of a passenger entertainment system and a top view of an image display and projection assembly according to a preferred embodiment of the subject invention.

Each of the projection devices 27 to 29 includes, and each cathode ray tube 61 to 63 has associate therewith a projection lens system including or represented by a lens 84, 85 or 86 for projecting the color component images from the corresponding cathode ray tube face onto the screen 17 to provide the color video picture within a square outline as shown at 41 in FIG. 3. Each of the lenses 84, 85 and 86 has an axis 87, 88 and 89, respectively. A line 91 in FIG. 4b is intended to designate the preferably vertical plane in which the flat screen 17 is mounted. According to the preferred embodiment shown in FIG. 4, the lens axis 87 to 89 extend perpendicularly to the plane 91 of the projection screen. Also, the display faces of the cathode ray tubes 61, 62 and 63 extend parallel to the plane 91 of the display screen. Typically, this means that the longitudinal axes of the display tubes 61, 62 and 63 extend perpendicularly to the plane 91 of the display screen 17.

Each display or cathode ray tube 61 to 63 presents at its face a color component image in an image display field. In particular, and with reference to FIGS. 4b, 5 and 6, the first imaging device or tube 61 in the image projecting device 27 presents a first one of the complementary color component images in a first image display field 93. The first image display field 93 has a first center 94. A first projecting device including the first lens 84 for projecting the first image from the first field 93 onto the screen 17 has a first lens axis 87.

The second imaging device or tube 62 presents a second one of the three color component images in a second image display field 95. The second image display field has a second center 96. The second projecting device includes a second lens 85 for projecting the second color component image from the second field 95 onto the screen 17. The second lens 85 has a second lens axis 88. The third imaging device or tube 63 presents the third of the three color component images in a third image display field 97. The third image display field 97 has a third center 98. A third projecting device includes the third lens 86 for projecting the third color component image from the third field 97 onto the screen 17. The third lens 86 has a third lens axis 89.

Each of the first, second and third image display fields 93, 95 and 97 is disposed in a plane parallel to the first plane 91 of the projection screen. According to FIG. 4b, the first, second and third image display fields and disposed in a common plane extending parallel to the screen plane 91. Alternatively, the image display fields 93, 95 and 97 may be disposed in different planes, as long as each of these planes, in accordance with a preferred embodiment of the subject invention, is parallel to the screen plane 91. Mounting brackets 100, 101 and 102 are shown in FIG. 4b to illustrate means for mounting the cathode ray tubes 61, 62 and 63 and for positioning the image display fields 93, 95 and 97 as herein disclosed. Similarly, lens mounts 104, 105 and 106 are indicated in FIGS. 4b and 5 to illustrate means for positioning the lenses and lens axes as herein disclosed.

In particular, a closer spacing is provided between the second and third axes 88 and 89 of the second and third lenses 85 and 86 than between the second and third centers 96 and 98 of the second and third image display fields 95 and 97. This may also be expressed by saying that the second axis 88 is closer to the first axis 87 than the second center 96 to the first center 94, and that the third axis 98 is closer to the first axis 87 than the third center 98 to the first center 94. As seen from the point of view of the passengers accommodated in the seats 21, 22 etc., the first, second and third image display fields 93, 95 and 97 are disposed above a horizontal plane 108 which intersects a midportion of the screen 17 at right angles as indicated in FIG. 1. Each of the first, second and third lens axes 87, 88 and 89 is located closer to the horizontal plane 108 than the first, second and third centers 94, 96 and 98, respectively, of the first, second and third image display fields 93, 95 and 97.

As seen further in FIG. 6, each of the first, second and third centers 94, 96 and 98 of the first, second and third image display fields 93, 95 and 97 is located closer to the cabin ceiling 14 than, respectively, a center of the first lens 84 situated at the location of the axis 87, a center of the second lens 85 situated at the location of the axis 88, and a center of the third lens 86 situated at the location of the axis 89.

In practice it is possible that the displacement of the lenses herein shown relative to the corresponding image field centers introduces shading or uneven brightness into the projected images. For instance, the lower portion of the displaced lens 86 as seen in FIG. 4b is apt to receive more light from the color component image 97 than the upper portion of that lens.

Figure 4A:
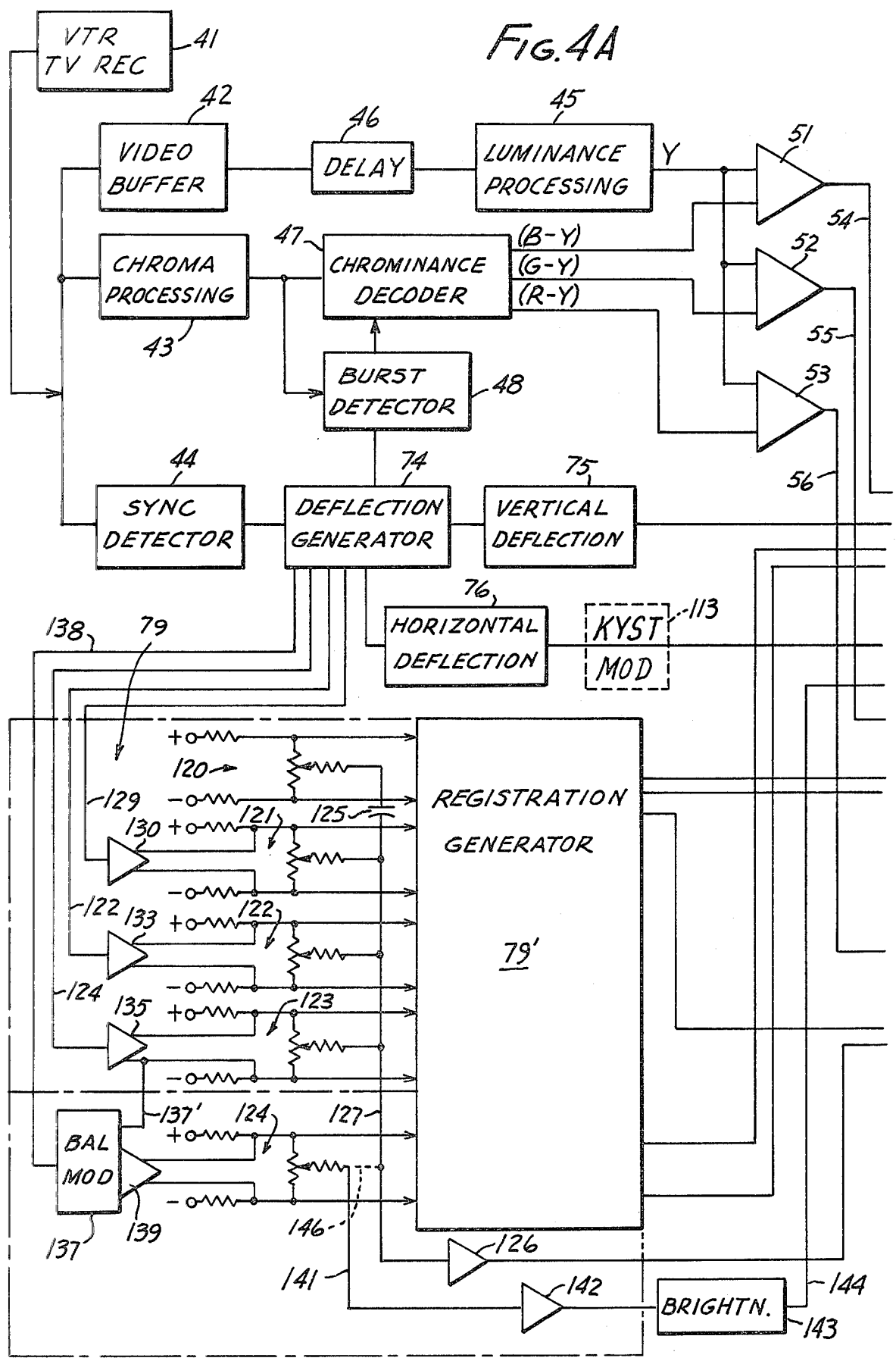

In consequence, the region of the projected image on the screen 17 corresponding to the lower portion of the displaced lens 86 as seen in FIG. 4a will generally tend to be brighter than the region corresponding to the opposite upper lens portion, which will tend to display shading in the projected image. As to the second and third or outer lenses 85 and 86, such brightness variations or shading tend to appear in both vertical and horizontal marginal regions of the projected image.

The presently considered shading or brightness variation effects are herein referred to as "spatial brightness variations" in distinction to brightness variations which belong to the information content of the picture.

According to preferred embodiments of the subject invention, spatial brightness variations may be countered or precorrected optically or electronically. For instance, and as shown in FIGS. 4b, 5 and 6 for the lens 85, marginal portions of the lens may be cut off, truncated or otherwise omitted to prevent an excess of light to be captured and projected by such marginal portions.

Alternatively or additionally, marginal portions of at least some of the first, second and third projecting devices 27, 28 and 29 may be selectively obscured to precorrect spatial brightness variations in the projected color video picture on the screen 17. In this respect, FIGS. 4b and 6 show a mask 90 for obscuring part of the optical path of the projecting device 29 at the lens 86 for introducing spatial brightness variations which are opposite to, or counter, the brightness variations inherent in the illustrated lateral displacement of the lens 86. If desired, the outline 90 may be considered illustrative of a variable density filter located in the optical path of the projecting device 29 for partially and, if desired gradually, obscuring excess light that would otherwise lead to spatial brightness variations in the projected color video image.

An electronic precorrection of spatial brightness variations may be provided in the context of the circuitry of FIG. 4, such as in connection with the operation of the registration generator.

As shown by way of example in FIG. 4, the registration generator 79 may include a vertical centering circuit 120, a horizontal bow correction circuit 121, a vertical linearity adjustment circuit 122, a vertical size adjustment circuit 123, and a spatial brightness variation precorrection circuit 124. Each of these circuits has three resistors connected in series across a source of direct current, with the middle one of these resistors being a potentiometer for effecting the particular adjustment.

The variable output of the centering circuit is connected via a coupling capacitor 125 to the input of an operational amplifier 126, to which the variable outputs of the circuits 121, 122, and 123 are also connected via a lead 127.

A lead 129 derives from the deflection generator 74 the familiar horizontal parabolic signal representing horizontal yoke current and drives a phase splitter 130 with that signal. Similarly, the lead 132 derives from the deflection generator 74 the familiar vertical parabolic signal representing vertical yoke current and drives a phase splitter 133 with that signal.

A lead 134 derives the vertical ramp signal from the deflection generator 74 and drives a phase splitter 135. The phase splitters 130, 133 and 135, in turn, drive the bow correction circuit 121, vertical linearity adjustment circuit 122 and vertical size adjustment circuit 123, respectively.

A lead 137' applies a vertical ramp signal also to one input of a balanced modulator 137. The other input of the balanced modulator 137 is supplied with a horizontal ramp signal from the deflection generator 74 via a lead 138. The balanced modulator, in turn, applies to a phase splitter 139 a signal composed of horizontal ramp signal oscillations in a vertical ramp signal envelope. The phase splitter 139 drives the circuit 124 for a precorrection of spatial brightness variations in the image projected, for instance, at 27 and 84. In this respect, a lead 141 applies the output of the precorrection circuit to an operational amplifier 142 which, in turn, drives a brightness control 143 for the cathode ray display tube 61 via a lead 144.

The lead 144 varies the voltage at a brightness control electrode or grid 145 of the tube 61 in synchronism with the ramp functions generated at 137 and 139, thereby effecting a recurring spatial brightness control.

If desired, and as indicated by a dotted outline at 146, the output of the precorrection circuit 124 may also be applied via the common lead 127 to the operational amplifier 126, to provide an electronic horizontal keystone precorrection function that in the context of the display device 28 may be supportive of the optical keystone precorrection function of the laterally displaced lens 85, for instance.

The optical, as well as the mixed optical and electronic precorrection of spatial brightness variations or deviations, while illustrated in the drawings in connection with particular lenses, or display devices may, of course, be applied to two or all three of the lenses or display devices, as desired or necessary.

The operational amplifier 126 drives the vertical section of the auxiliary yoke 72 in response to the output signals of the circuits 120, 121, 122 and 123, as well as 124, if desired. The voltages or signals across the potentiometers are in FIG. 4 shown as applied to a block 79' within the registration generator 79, to indicate that these circuits may be multiplied for the horizontal section of the yoke 72 and for vertical and horizontal sections of the other auxiliary yokes 71 and 73.

For instance, further potentiometers connected in parallel to the potentiometers shown for the circuits 120, 121, 122 and 123, and an operational amplifier corresponding to the amplifier 126 and connected to the latter further potentiometers, may in the block 70' provide, respectively, a horizontal centering function, a horizontal linearity adjustment, a vertical bow adjustment and a skew or orthogonality adjustment, in conjunction with the horizontal section of the auxiliary yoke 72.

Such adjustments may in the same manner be provided for the horizontal and vertical sections of the auxiliary yoke 73. If desired, a supportive electronic precorrection for spatial brightness variations may be provided for the auxiliary yoke 73 in the manner shown at 124 and 146. In practice, the circuits for driving the auxiliary yoke 71 for the central cathode ray tube 61 need not have a counterpart for every potentiometer shown for the circuits 120 to 123; though such additional potentiometers may, of course, be provided, if desired. State of the art technology may also be employed for implementing the keystone modulator 113, if present, in similarity to the circuitry including components 124, 137 and 139.

Figure 2:
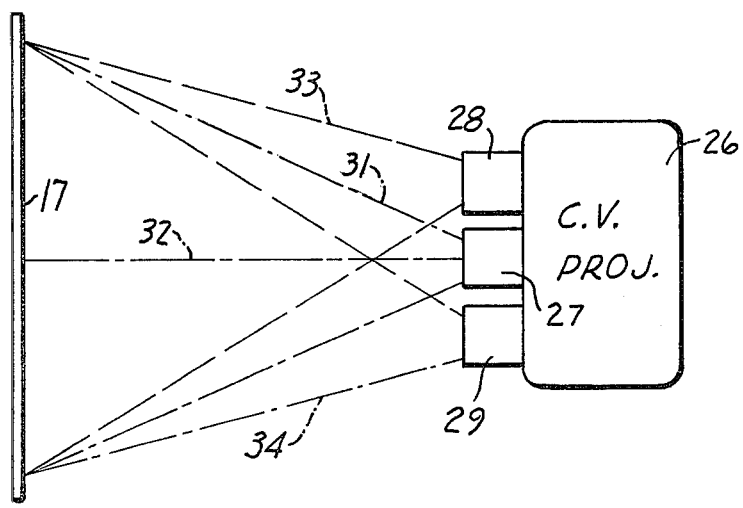
FIG. 2 is a top view of part of the passenger entertainment system shown in FIG. 1.

As seen from a comparison of FIGS. 1 and 2, the first, second and third locations from which images are projected, or the first, second and third projection devices 27 to 29 preferably are equidistant from the cabin floor 13, whereby essentially the same vertical keystone precorrection technique may be employed for all three projection devices or lens systems.

In accordance with a further embodiment of the subject invention, the items 87, 88 and 89 shown in FIG. 4b may be viewed as three parallel planes which extend between the cabin ceiling 14 and floor 13 at right angles to the screen 17 or first plane 91. In that case, the first, second and third lens axes are disposed in such three parallel planes.

The teachings of the subject invention relating to optical correction of keystone effects may be combined with electronic keystone correction. For example, and with reference of FIG. 7, the teaching of the subject invention may be employed for a partial precorrection of keystoning. In particular, image display fields and lenses may be tilted as presently disclosed. A tilted projectiong unit is indicated in FIG. 1 by a dotted outline 29'.

According to the embodiment shown in FIG. 7, each image display field 93, 95 and 97 is disposed in a plane intersecting the first plane 91 of the display screen 17 along a line extending parallel to the cabin floor 13. For instance, the three image display fields 93, 95 and 97 may be disposed in a common plane which intersects the first plane 91 along a line extending parallel to the cabin floor. Alternatively, each of the image display fields 93, 95 and 97 may, in principle, be located in a different plane, as long as each such plane intersects the first plane 91 along a line extending parallel to the cabin floor 13. Of course, such line need not intersect the plane of the display screen 17 within the confines of the frame 18.

Rather, such line of intersection typically will be considerably above the screen 17 where the plane 91 in which the screen 17 is located meets the plane or planes in which the image display fields 93, 95 and 97 are situated. This, in effect, distinguishes the currently discussed embodiment of the subject invention from prior-art systems, such as the system shown in the above mentioned U.S. Pat. No. 2,645,854 wherein the outer display devices are laterally tilted relative to the display screen. The means for mounting the display devices and fields are symbolized in FIG. 7 by an angled bracket 112.

In the embodiment illustrated in FIG. 7, keystone precorrection again includes the step of providing a closer spacing between the second and third axes 88 and 89 of the second and third lenses 85 and 86 than between the second and third centers 96 and 98 of the second and third image display fields 95 and 97. However, because of the tilt to the vertical of the image display fields and lenses, a vertical keystoning tendency arises. Such vertical keystoning (note lines 36 and 37 in FIG. 3) may be corrected electronically, such as by a keystone modulator 113 connected between the horizontal deflection unit 76 and the principal yokes 65, 66 and 67 as indicated in dotted outline in FIG. 4a. In practice, the keystone modulator 113 may employ state of the art technology by imposing in effect on each horizontal line display a length variation which opposes any length variation due to keystoning. As a result, effects of vertical keystoning are eliminated in the three color component images projected on the screen 17.

Horizontal keystoning (see lines 38 and 39 in FIG. 3) is in this case again corrected by the positioning of the outer lenses 85 and 86 so that the second and third axes 88 and 89 or the corresponding centers of the second and third lenses 85 and 86 are located closer to each other than the second and third centers 96 and 98 of the second and third image display fields 95 and 97.

Screens of the type of screen 17 having preferably an on-axis gain of more than one and less than four are commercially available. The on-axis gain in effect is a ratio between light reflection properties of a screen, such as the screen 17, along an axis perpendicular to the screen and corresponding light reflecting properties of a standard white chalk surface.

The optical keystone correcting techniques of the subject invention and its preferred embodiments at least alleviate the requirement for electronic keystone correction and in their practical implementations provide airborne color video display system of superior performance.

Various modifications and variations within the spirit and scope of the subject invention are suggested or rendered apparent to those skilled in the art by the subject extensive disclosure.

I claim:

1. In a method of displaying color video pictures to passengers aboard an aircraft with the aid of a first imaging device for presenting a first one of three complementary color component images in a first image display field, said first image display field having a first center, a first projecting device including a first lens for projecting said first image from said first field onto a screen, said first lens having a first lens axis, a second imaging device for presenting a second one of said color component images in a second image display field, said second image display field having a second center, a second projecting device including a second lens for projecting said second image from said second field onto said screen, said second lens having a second lens axis, a third imaging device for presenting the third of said color component images in a third image display field, said third image display field having a third center, and a third projecting device including a third lens for projecting said third image from said third field onto said screen, said third lens having a third lens axis, the improvement comprising in combination the steps of:

mounting said screen in a first plane;

disposing said first image display field in a plane parallel to said first plane;

disposing said second image display field in a plane parallel to said first plane;

disposing said third image display field in a plane parallel to said first plane;

disposing each of said first, second and third lens axes perpendicularly to said first plane;

providing a closer spacing between said second and third axes of said second and third lenses than between said second and third centers of said second and third image display fields;

omitting marginal portions of at least some of said first, second and third lenses to precorrect spatial rightness variations in the color video picture;

providing three complementary color component image signals for composing via said first, second and third imaging and projecting devices a color video picture;

applying said three complementary color component signals respectively to said first, second and third imaging devices for providing said first, second and third color component images respectively in said first, second and third image display fields; and projecting said provided first, second and third color component images respectively with said first, second and third projecting devices, including said first, second and third lenses, onto said screen for composite viewing of said color video picture by said passengers.

2. In a method of displaying color video pictures to passengers aboard an aircraft having a floor and a ceiling above said floor, with the aid of a first imaging device for presenting a first one of three complementary color component images in a first image display field, said first image display field having a first center, a first projecting device including a first lens for projecting said first image from said first field onto a screen, said first lens having a first lens axis, a second imaging device for presenting a second one of said color component images in a second image display field, said second image display field having a second center, a second projecting device including a second lens for projecting said second image from said second field onto said screen, said second lens having a second lens axis, a third imaging device for presenting the third of said color component images in a third image display field, said third image display field having a third center, and a third projecting device including a third lens for projecting said third image from said third field onto said screen, said third lens having a third lens axis, the improvement comprising in combination the steps of:

mounting said screen between said ceiling and floor in a first plane;

disposing said first image display field in a plane parallel to said first plane;

disposing said second image display field in a plane parallel to said first plane;

disposing said third image display field in a plane parallel to said first plane;

disposing said first, second and third lens axes in three parallel planes extending between said ceiling and floor at right angles to said screen;

providing a closer spacing between said second and third axes of said second and third lenses than between said second and third centers of said second and third image display fields;

omitting marginal portions of at least some of said first, second and third lenses to precorrect spatial brightness variations in the color video picture;

providing three complementary color component image signals for composing via said first, second and third imaging and projecting devices a color video picture;

applying said three complementary color component signals respectively to said first, second and third imaging devices for providing said first, second and third color component images respectively in said first, second and third image display fields; and projecting said provided first, second and third color component images respectively with said first, second and third projection devices, including said first, second and third lenses, onto said screen for composite viewing of said color video picture by said passengers.

3. A method as claimed in claim 1 or 2, wherein:
said first, second and third image display fields are disposed in a common plane parallel to said first plane.

4. A method as claimed in claim 1 or 2, wherein:
said first, second and third image display fields are disposed, as seen from said passengers, above a horizontal plane intersecting a midportion of said screen; and each of said first, second and third lens axes is located closer to said horizontal plane than said first, second and third centers, respectively, of said first, second and third image display fields.

5. In a method of displaying color video pictures to passengers aboard an aircraft having a floor and a ceiling above said floor, with the aid of a first imaging device for presenting a first one of three complementary color component images in a first image display field, said first image display field having a first center, a first projecting device including a first lens for projecting said first image from said first field onto a screen, said first lens having a first lens axis, a second imaging device for presenting a second one of said color component images in a second image display field, said second image display field having a second center, a second projecting device including a second lens for projecting said second image from said second field onto said screen, said second lens having a second lens axis, a third imaging device for presenting the third of said color component images in a third image display field, said third image display field having a third center, and a third projecting device including a third lens for projecting said third image from said third field onto said screen, said third lens having a third lens axis, the improvement comprising in combination the steps of:

mounting said screen between said ceiling and floor in a first plane;

disposing said first image display field in a plane intersecting said first plane along a line extending parallel to said floor;

disposing said second image display field in a plane intersecting said first plane along a line extending parallel to said floor;

disposing said third image display field in a plane intersecting said first plane along a line extending parallel to said floor;

disposing said first, second and third lens axes in three parallel planes extending between said ceiling and floor at right angles to said screen;

providing a closer spacing between said second and third axes of said second and third lenses than between said second and third centers of said second and third image display fields;

omitting marginal portions of at least some of said first, second and third lenses to precorrect spatial brightness variations in the color video picture;

providing three complementary color component image signals for composing via said first, second and third imaging and projecting devices a color video picture;

applying said three complementary color component signals respectively to said first, second and third imaging devices for providing said first, second and third color component images respectively in said first, second and third image display fields; and projecting said provided first, second and third color component images respectively with said first, second and third projecting devices, including said first, second and third lenses, into said screen for composite viewing of said color video picture by said passengers.

6. A method as claimed in claim 5, wherein:
said first, second and third image display fields are disposed in a common plane intersecting said first plane along a line extending parallel to said floor.

7. A method as claimed in claim 2 or 5, wherein:
each of said first, second and third centers of said first, second and third image display fields is located closer to said ceiling than, respectively, a center of said first lens, a center of said second lens, and a center of said third lens.

8. A method as claimed in claim 1, 2, 5 or 6, wherein:
said screen has an on-axis gain of more than one and less than four.

9. A method as claimed in claim 1, 2, 5 or 6, including the step of:
further precorrecting spatial brightness variations in the color video picture by subjecting at least some of said presented first, second and third color component images in said first, second and third image display fields, respectively, to opposing spatial brightness variations.

10. Apparatus for displaying color video pictures to passengers aboard an aircraft, comprising in combination:
means for providing three complementary color component image signals for composing a color video picture;
a video image projection screen;
means for mounting said screen in a first plane; and
means connected to said providing means for projecting in response to said three color component image signals three complementary color component images onto said screen mounted in said first plane for composite viewing of said color video picture by said passengers;
said projecting means including:

a first imaging device for presenting in response to a first one of said color component image signals a first one of said complementary color component images in a first image display field, and first image display field having a first center;
means for mounting said first imaging device for disposition of said first image display field in a plane parallel to said first plane;
a first projecting device including a first lens for projecting said first image from said first field onto said screen, said first lens having a first lens axis extending perpendicularly to said first plane;
a second imaging device for presenting in response to a second one of said color component image signals a second one of said color component images in a second image display field, said second image display field having a second center;
means for mounting said second imaging device for disposition of said second image display field in a plane parallel to said first plane;
a second projecting device including a second lens for projecting said second image from said second field onto said screen, said second lens having a second lens axis extending perpendicularly to said first plane;
a third imaging device for presenting in response to the third of said color component image signals the third of said color component images in a third image display field, said third image display field having a third center;
means for mounting said third imaging device for disposition of said third image display field in a plane parallel to said first plane;
a third projecting device including a third lens for projecting said third image from said third field onto said screen, said third lens having a third lens axis extending perpendicularly to said first plane; and
means for mounting said lenses relative to said image display fields for a closer spacing between said second and third axes of said second and third lenses than between said second and third centers of said second and third image display fields, with said first, second and third lens axes remaining perpendicular to said first plane;
at least some of said first, second and third lenses having truncated margins for precorrecting spatial brightness variations in the color video picture.

11. Apparatus for displaying color video pictures to passengers aboard an aircraft having a floor and a ceiling above said floor, comprising in combination:
means for providing three complementary color component image signals for composing a color video picture;
a video image projection screen;
means for mounting said screen between said ceiling and said floor in a first plane; and
means connected to said providing means for projecting in response to said three color component image signals three complementary color component images onto said screen mounted in said first plane for composite viewing of said color video picture by said passengers;
said projecting means including:
a first imaging device for presenting in response to a first one of said color component image signals a first one of said complementary color component images in a first image display field, said first image display field having a first center;

means for mounting said first imaging device for disposition of said first image display field in a plane parallel to said first plane;

a first projecting device including a first lens for projecting said first image from said first field onto said screen, said first lens having a first lens axis;

a second imaging device for presenting in response to a second one of said color component image signals a second one of said color component images in a second image display field, said second image display field having a second center;

means for mounting said second imaging device for disposition of said second image display field in a plane parallel to said first plane;

a second projecting device including a second lens for projecting said second image from said second field onto said screen, said second lens having a second lens axis;

a third imaging device for presenting in response to the third of said color component image signals the third or said color component images in a third image display field, said third image display field having a third center;

means for mounting said third imaging device for disposition of said third image display field in a plane parallel to said first plane;

a third projecting device including a third lens for projecting said third image from said third field onto said screen, said third lens having a third lens axis; and means for mounting said first, second and third projecting devices for disposition of said first, second and third lens axes in three parallel planes extending between said ceiling and floor at right angles to said screen, said projecting devices mounting means including means for mounting said lenses relative to said image display fields for a closer spacing between said second and third axes of said second and third lenses than between said second and third centers of said second and third image display fields, with said first, second and third lens axes remaining disposed in said three parallel planes;

at least some of said first, second and third lenses having truncated margins for precorrecting spatial brightness variations in the color video picture.

12. Apparatus as claimed in claim 10 or 11, wherein:
said means for mounting said first, second and third imaging devices include means for mounting said first, second and third imaging devices for disposition of said first, second and third image display fields in a common plane parallel to said first plane.

13. Apparatus as claimed in claim 10 or 11, wherein:
said means for mounting said first, second and third imaging devices include means for mounting said first, second and third imaging devices, as seen from said passengers, above a horizontal plane intersecting a midportion of said screen; and
said means for mounting said first, second and third projecting devices include means for mounting said first, second and third projecting device for disposition of said first, second and third lens axes closer to said horizontal plane than, respectively, said first, second and third centers of said first, second and third image display fields.

14. Apparatus for displaying color video pictures to passengers aboard an aircraft having a floor and a ceiling above said floor, comprising in combination:

means for providing three complementary color component image signals for composing a color video picture;

a video image projection screen;

means for mounting said screen between said ceiling and said floor in a first plane; and means connected to said providing means for projecting in response to said three color component image signals three complementary color component images onto said screen mounted in said first plane for composite viewing of said color video picture by said passengers;

said projecting means including:

a first imaging device for presenting in response to a first one of said color component image signals a first one of said complementary color component images in a first image display field, said first image display field having a first center;

means for mounting said first imaging device for disposition of said first image display field in a plane intersecting said first plane along a line extending parallel to said floor;

a first projecting device including a first lens for projecting said first image from said first field onto said screen, said first lens having a first lens axis;

a second imaging device for presenting in response to a second one of said color component image signals a second one of said color component images in a second image display field, said second image display field having a second center;

means for mounting said second imaging device for disposition of said second image display field in a plane intersecting said first plane along a line extending parallel to said floor;

a second projecting device including a second lens for projecting said second image from said second field onto said screen, said second lens having a second lens axis;

a third imaging device for presenting in response to the third of said color component image signals the third or said color component images in a third image display field, said third image display field having a third center;

means for mounting said third imaging device for disposition of said third image display field in a plane intersecting said first plane along a line extending parallel to said floor;

a third projecting device including a third lens for projecting said third image from said third field onto said screen, said third lens having a third lens axis; and means for mounting said first, second and third projecting devices for disposition of said first, second and third lens axes in three parallel planes extending between said ceiling and floor at right angles to said screen, said projecting devices mounting means including means for mounting said lenses relative to said image display fields for a closer spacing between said second and third axes of said second and third lenses than between said second and third centers of said second and third image display fields, with said first, second and third lens axes remaining disposed in said three parallel planes;

at least some of said first, second and third lenses have truncated margins for precorrecting spatial brightness variations in the color video picture.

15. Apparatus as claimed in claim 14, wherein:
said means for mounting said first, second and third imaging devices include means for mounting said first, second and third imaging devices for disposition of said first, second and third image display fields in a common plane intersecting said first plane along a line extending parallel to said floor.

16. Apparatus as claimed in claim 11 or 14, wherein:
each of said first, second and third centers of said first, second and third image display fields is closer to said ceiling than, respectively, a center of said first lens, a center of said second lens, and a center of said third lens.

17. Apparatus as claimed in claim 10, 11, 14 or 15 wherein:
said screen has an on-axis gain of more than one and less than four.

18. In a method of displaying color video pictures with the aid of a first imaging device for presenting a first one of three complementary color component images in a first image display field, said first image display field having a first center, a first projecting device including a first lens for projecting said first image from said first field onto a screen, said first lens having a first lens axis, a second imaging device for presenting a second one of said color component images in a second image display field, said second image display field having a second center, a second projecting device including a second lens for projecting said second image from said second field into said screen, said second lens having a second lens axis, a third imaging device for presenting the third of said color component images in a third image display field, said third image display field having a third center, and a third projecting device including a third lens for projecting said third image from said third field onto said screen, said third lens having a third lens axis, the improvement comprising in combination the steps of:
mounting said screen in a first plane;
disposing said first image display field in a plane parallel to said first plane;
disposing said second image display field in a plane parallel to said first plane;
disposing said third image display field in a plane parallel to said first plane;
disposing each of said first, second and third lens axes perpendicularly to said first plane;
providing a closer spacing between said second and third axes of said second and third lenses than between said second and third centers of said second and third image display fields;
omitting marginal portions of at least some of said first, second and third lenses to precorrect spatial brightness variations in the color video picture;
providing three complementary color component image signals for composing via said first, second and third imaging and projecting devices a color video picture;
applying said three complementary color component signals respectively to said first, second and third imaging devices for providing said first, second and third color component images respectively in said first, second and third image display fields; and
projecting said provided first, second and third color component images respectively with said first, second and third projecting devices, including said first, second and third lenses, onto said screen for composite viewing of said color video picture by viewers.

19. In a method of displaying color video pictures in a structure having a floor and a ceiling above said floor, with the aid of a first imaging device for presenting a first one of three complementary color component images in a first image display field, said first image display field having a first center, a first projecting device including a first lens for projecting said first image from said first field onto a screen, said first lens having a first lens axis, a second imaging device for presenting a second one of said color component images in a second image display field, said second image display field having a second center, a second projecting device including a second lens for projecting said second image from said second field onto said screen, said second lens having a second lens axis, a third imaging device for presenting the third of said color component images in a third image display field, said third image display field having a third center, and a third projecting device including a third lens for projecting said third image from said third field onto said screen, said third lens having a third lens axis, the improvement comprising in combination the steps of:
mounting said screen between said ceiling and floor in a first plane;
disposing said first image display field in a plane parallel to said first plane;
disposing said second image display field in a plane parallel to said first plane;
disposing said third image display field in a plane parallel to said first plane;
disposing said first, second and third lens axes in three parallel planes extending between said ceiling and floor at right angles to said screen;
providing a closer spacing between said second and third axes of said second and third lenses than between said second and third centers of said second and third image display fields;
omitting marginal portions of at least some of said first, second and third lenses to precorrect spatial brightness variations in the color video picture;
providing three complementary color component image signals for composing via said first, second and third imaging and projecting devices a color video picture;
applying said three complementary color component signals respectively to said first, second and third imaging devices for providing said first, second and third color component images respectively in said first, second and third image display fields; and
projecting said provided first, second and third color component images respectively with said first, second and third projecting devices, including said first, second and third lenses, onto said screen for composite viewing of said color video picture by viewers.

20. A method as claimed in claim 18 or 19, wherein:
said first, second and third image display fields are disposed in a common plane parallel to said first plane.

21. A method as claimed in claim 18 or 19, wherein:
said first, second and third image display fields are disposed, as seen from said passengers, above a horizontal plane intersecting a midportion of said screen; and each of said first, second and third lens axes is located closer to said horizontal plane than said first, second and third centers, respectively, of said first, second and third image display fields.

22. In a method of displaying color video pictures in a a structure having a floor and a ceiling above said floor, with the aid of a first imaging device for presenting a first one of three complementary color component images in a first image display field, said first image display field having a first center, a first projecting device including a first lens for projecting said first image from said first field onto a screen, said first lens having a first lens axis, a second imaging device for presenting a second one of said color component images in a second image display field, said second image display field having a second center, a second projecting device including a second lens for projecting said second image from said second field onto said screen, said second lens having a second lens axis, a third imaging device for presenting the third of said color component images in a third image display field, said third image display field having a third center, and a third projecting device including a third lens for projecting said third image from said third field onto said screen, said third lens having a third lens axis, the improvement comprising in combination the steps of:

mounting said screen between said ceiling and floor in a first plane;

disposing said first image display field in a plane intersecting said first plane along a line extending parallel to said floor;

disposing said second image display field in a plane intersecting said first plane along a line extending parallel to said floor;

disposing said third image display field in a plane intersecting said first plane along a line extending parallel to said floor;

disposing said first, second and third lens axes in three parallel planes extending between said ceiling and floor at right angles to said screen;

providing a closer spacing between said second and third axes of said second and third lenses than between said second and third centers of said second and third image display fields;

omitting marginal portions of at least some of said first, second and third lenses to precorrect spatial brightness variations in the color video picture;

providing three complementary color component image signals for composing via said first, second and third imaging and projecting devices a color video picture;

applying said three complementary color component signals respectively to said first, second and third imaging devices for providing said first, second and third color component images respectively in said first, second and third image display fields; and projecting said provided first, second and third color component images respectively with said first, second and third projecting devices, including said first, second and third lenses, onto said screen for composite viewing of said color video picture by viewers.

23. A method as claimed in claim 22, wherein:

said first, second and third image display fields are disposed in a common plane intersecting said first plane along a line extending parallel to said floor.

24. A method as claimed in claim 19 or 22, wherein:

each of said first, second and third centers of said first, second and third image display fields is located closer to said ceiling than, respectively, a center of said first lens, a center of said second lens, a center of said third lens.

25. A method as claimed in claim 18, 19, 22 or 23, wherein:

said screen has an on-axis gain of more than one and less than four.

26. A method as claimed in claim 18, 19, 22 or 23, including the step of:

further precorrecting spatial brightness variations in the color video picture by subjecting at least some of said presented first, second and third color component images in said first, second and third image display fields, respectively, to opposing spatial brightness variations.

27. Apparatus for displaying color video pictures, comprising in combination:

means for providing three complementary color component image signals for composing a color video picture;

a video image projection screen;

means for mounting said screen in a first plane; and means connected to said providing means for projecting in response to said three color component image signals three complementary color component images onto said screen mounted in said first plane for composite viewing of said color video picture by viewers;

said projecting means including:

a first imaging device for presenting in response to a first one of said color component image signals a first one of said complementary color component images in a first image display field, said first image display field having a first center;

means for mounting said first imaging device for disposition of said first image display field in a plane parallel to said first plane;

a first projecting device including a first lens for projecting said first image from said first field onto said screen, said first lens having a first lens axis extending perpendicularly to said first plane;

a second imaging device for presenting in response to a second one of said color component image signals a second one of said color component images in a second image display field, said second image display field having a second center;

means for mounting said second imaging device for disposition of said second image display field in a plane parallel to said first plane;

a second projecting device including a second lens for projecting said second image from said second field onto said screen, said second lens having a second lens axis extending perpendicularly to said first plane;

a third imaging device for presenting in response to the third of said color component image signals the third of said color component images in a third image display field, said third image display field having a third center;

means for mounting said third imaging device for disposition of said third image display field in a plane parallel to said first plane;

a third projecting device including a third lens for projecting said third image from said third field onto said screen, said third lens having a third lens axis extending perpendicularly to said first plane; and means for mounting said lenses relative to said image display fields for a closer spacing between said second and third axes of said second and third lenses than between said second and third centers of said second and third image display fields, with said first, second and third lens axes remaining perpendicular to said first plane;

at least some of said first, second and third lenses having truncated margins for precorrecting spatial brightness variations in the color video picture.

28. Apparatus for displaying color video pictures in a structure having a floor and a ceiling above said floor, comprising in combination:

means for providing three complementary color component image signals for composing a color video picture;

a video image projecting screen;

means for mounting said screen between said ceiling and said floor in a first plane; and means connected to said providing means for projecting in response to said three color component image signals three complementary color component images onto said screen mounted in said first plane for composite viewing of said color video picture by viewers;

said projecting means including:

a first imaging device for presenting in response to a first one of said color component image signals a first one of said complementary color component images in a first image display field, said first image display field having a first center;

means for mounting said first imaging device for disposition of said first image display field in a plane parallel to said first plane;

a first projecting device including a first lens for projecting said first image from said first field onto said screen, said first lens having a first lens axis;

a second imaging device for presenting in response to a second one of said color component image signals a second one of said color component images in a second image display field, said second image display field having a second center;

means for mounting said second imaging device for disposition of said second image display field in a plane parallel to said first plane;

a second projecting device including a second lens for projecting said second image from said second field onto said screen, said second lens having a second lens axis;

a third imaging device for presenting in response to the third of said color component image signals the third or said color component images in a third image display field, said third image display field having a third center;

means for mounting said third imaging device for disposition of said third image display field in a plane parallel to said first plane;

a third projecting device including a third lens for projecting said third image from said third field onto said screen, said third lens having a third lens axis; and means for mounting said first, second and third projecting devices for disposition of said first, second and third lens axes in three parallel planes extending between said ceiling and floor at right angles to said screen, said projecting devices mounting means including means for mounting said lenses relative to said image display fields for a closer spacing between said second and third axes of said second and third lenses than between said second and third centers of said second and third image display fields, with said first, second and third lens axes remaining disposed in said three parallel planes;

at least some of said first, second and third lenses having truncated margins for precorrecting spatial brightness variations in the color video picture.

29. Apparatus as claimed in claim 27 or 28, wherein: said means for mounting said first, second and third imaging devices include means for mounting said first, second and third imaging devices for disposition of said first, second and third image display fields in a common plane parallel to said first plane.

30. Apparatus as claimed in claim 27 or 28, wherein: said means for mounting said first, second and third imaging devices include means for mounting said first, second and third imaging devices above a horizontal plane intersecting a midportion of said screen; and said means for mounting said first, second and third projecting devices include means for mounting said first, second and third projecting device for disposition of said first, second and third lens axes closer to said horizontal plane than, respectively, said first, second and third centers of said first, second and third image display fields.

31. Apparatus for displaying color video pictures in a structure having a floor and a ceiling above said floor, comprising in combination:

means for providing three complementary color component image signals for composing a color video picture;

a video image projection screen;

means for mounting said screen between said ceiling and said floor in a first plane; and means connected to said providing means for projecting in response to said three color component image signals three complementary color component images onto said screen mounted in said first plane for composite viewing of said color video picture by viewers;

said projecting means including:

a first imaging device for presenting in response to a first one of said color component image signals a first one of said complementary color component images in a first image display field, said first image display field having a first center;

means for mounting said first imaging device for disposition of said first image display field in a plane intersecting said first plane along a line extending parallel to said floor;

a first projecting device including a first lens for projecting said first image from said first field onto said screen, said first lens having a first lens axis;

a second imaging device for presenting in response to a second one of said color component image signals a second one of said color component images in a second image display field, said second image display field having a second center;

means for mounting said second imaging device for disposition of said second image display field in a plane intersecting said first plane along a line extending parallel to said floor;

a second projecting device including a second lens for projecting said second image from said second field onto said screen, said second lens having a second lens axis;

a third imaging device for presenting in response to the third of said color component image signals the third or said color component images in a third image display field, said third image display field having a third center;

means for mounting said third imaging device for disposition of said third image display field in a plane intersecting said first plane along a line extending parallel to said floor;

a third projecting device including a third lens for projecting said third image from said third field onto said screen, said third lens having a third lens axis; and means for mounting said first, second and third projecting devices for disposition of said first, second and third lens axes in three parallel planes extending between said ceiling and floor at right angles to said screen, said projecting devices mounting means including means for mounting said lenses relative to said image display fields for a closer spacing between said second and third axes of said second and third lenses than between said second and third centers of said second and third image display fields, with said first, second and third lens axes remaining disposed in said three parallel planes;

at least some of said first, second and third lenses have truncated margins for precorrecting spatial brightness variations in the color video picture.

32. Apparatus as claimed in claim 31, wherein:
said means for mounting said first, second and third imaging devices include means for mounting said first, second and third imaging devices for disposition of said first, second and third image display fields in a common plane intersecting said first plane along a line extending parallel to said floor.

33. Apparatus as claimed in claim 28 or 31, wherein:
each of said first, second and third centers of said first, second and third image display fields is closer to said ceiling than, respectively, a center of said first lens, a center of said second lens, and a center of said third lens.

34. Apparatus as claimed in claim 27, 28, 31 or 32, wherein:
said screen has an on-axis gain of more than one and less than four.

* * * * *